L. A. FRAYER & C. O. HOWARD.
TRANSMISSION GEARING FOR VEHICLES.
APPLICATION FILED SEPT. 15, 1908.
909,994.
Patented Jan. 19, 1909.
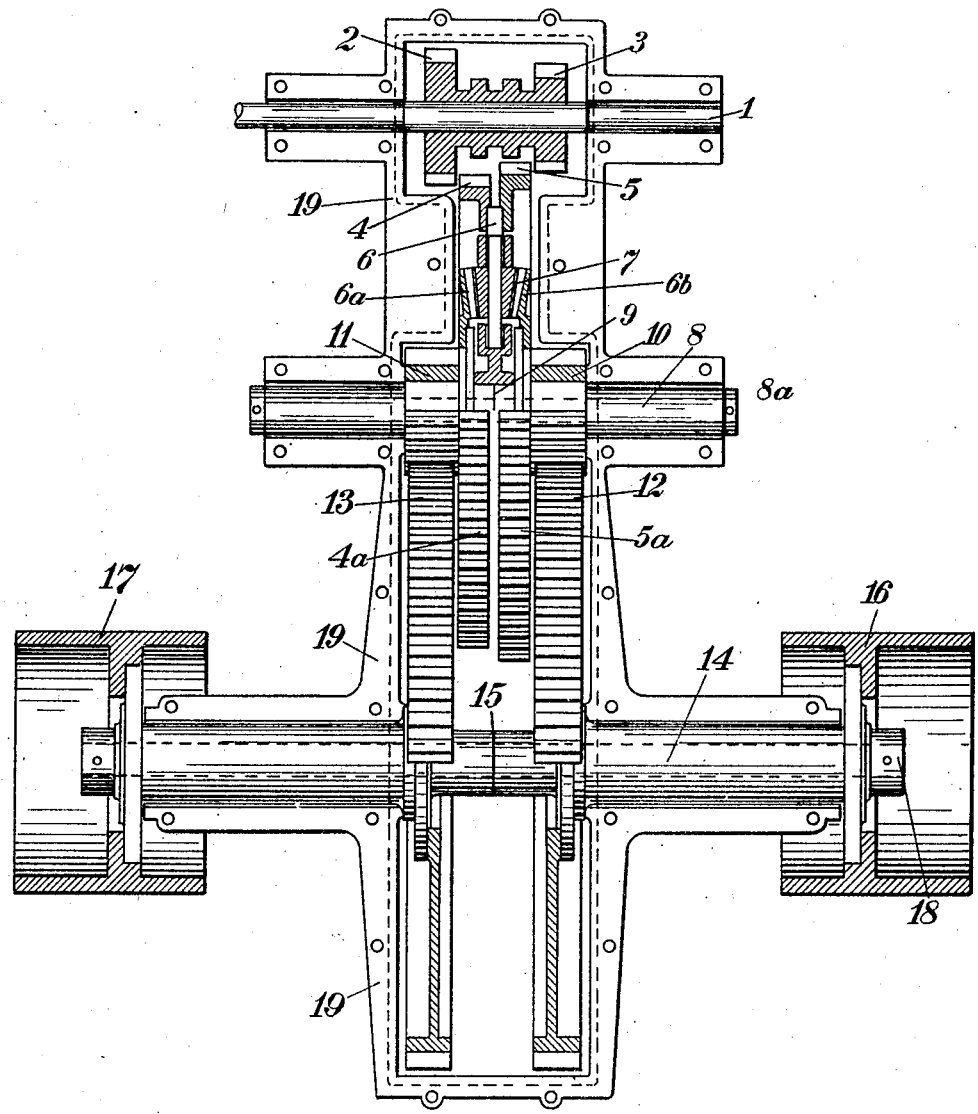

UNITED STATES PATENT OFFICE.

LEE A. FRAYER AND CHARLES O. HOWARD, OF COLUMBUS, OHIO, ASSIGNORS OF ONE-THIRD TO MOSES W. KOUNS, OF CLEVELAND, OHIO.

TRANSMISSION-GEARING FOR VEHICLES.

No. 909,994.　　　Specification of Letters Patent.　　　Patented Jan. 19, 1909.

Application filed September 15, 1908. Serial No. 453,202.

*To all whom it may concern:*

Be it known that we, LEE A. FRAYER and CHARLES O. HOWARD, citizens of the United States, residing at Columbus, in the county of Franklin and State of Ohio, have invented certain new and useful Improvements in Transmission-Gearing for Vehicles, of which the following is a specification.

Our invention relates to improvements in transmission gearing and contemplates especially the provision of a central drive, inclosable gear on the rear axle, the mounting of the differential at a point where it is not rendered subject to the strains of the road as it is when mounted in the axle, and also to mount the differential at a point where the strains incident to travel or usage are not capable of being multiplied as they are when the differential is mounted in the axle itself. To accomplish these purposes, it is found of great advantage and utility to mount the entire transmission construction between the bearings therefor, instead of mounting it beyond the bearings as in the constructions now in use; this construction permits a continuous housing to be provided for all of the parts because they are very compactly arranged. Not only is the arrangement thus provided more attractive in appearance, but novel features of construction are thereby introduced imparting many advantages which are not obtainable with constructions at present in use.

Referring to the drawings which are hereto attached and hereby made a part of this specification, the figure shows a plan view partly in section of the transmission construction ready for application to any desired purpose.

In the drawings in which the same numeral indicates the same part throughout, 1 is a drive shaft actuated from any convenient source of power, and the gears 2 and 3 thereon which are shown connected and adapted to be moved longitudinally on the shaft 1 by any of the well known constructions adapted for this purpose. The gear 2 is adapted to mesh with gear 4 and gear 3 is adapted to mesh with gear 5, gears 4 and 5 being secured to the differential spider at 6. Gears 4 and 5 are shown in plan at 4ª and 5ª.

The driven gear of the differential is shown at 7, and being adapted to operate in the usual manner need not be further described. The bevel gears 6ª and 6ᵇ of the differential mechanism are secured in a desired manner to the inner ends of the tubular shafts 8, the dividing line between said shafts being seen at 9; these shafts are adapted to rotate independently of each other, and when the transmission construction herein shown is applied to a vehicle, if the vehicle is moving in a straight line the driven gear 7 will not be called into operation; but when the vehicle is passing along a curve, the differential mechanism will be called into operation, and will consequently operate one of the tubular shafts 8 with greater speed than the other. Mounted upon the shafts respectively are the pinions 10 and 11, adapted to rotate therewith and being actuated through the gears 4 and 5 in the manner above described. The shafts act as trunnions and have their bearings appropriately formed dependent upon the use to which the construction is put; a tie-rod 8ª is inserted through the tubular trunnions or shafts for the purpose of alining the same and also receiving the side thrusts of the driven gear 7.

Pinions 10 and 11 being actuated as described, transmit power to the gear wheels 12 and 13 which are each mounted upon a portion of the tubular axle trunnions or shafts 14, the dividing line being shown at 15, whereby the axle trunnions are adapted to be actuated independently of each other. Mounted at the ends of these axle trunnions are pulleys or fly wheels or traction wheels 16 and 17, whichever construction is desired under the circumstances of use, by which the power communicated through drive shaft 1 is eventually utilized. The axle trunnions 14 receive the tie-rod 18, which keeps said trunnions in alinement, the tie-rod being loosely positioned therein.

When the driven gear 7 is called into action, the pinion 10, the gear wheel 12, and the wheel 16 are driven more rapidly or more slowly dependent upon the direction of the curve traveled over, than are pinion 11, gear wheel 13 and wheel 17, so that all of the advantages of the differential construction are derived while the disadvantages of locating the differential mechanism upon the rear axle are obviated. As stated above, when located upon an intermediate shaft construction as herein shown, the differential mechanism is not subject to the strains which necessarily fall upon the rear axle, and such strains are greatly increased also by the usage to which the rear axle is subject under normal operating conditions. Further, the bearings upon which are mounted the driving pinions 10 and 11 and the gear wheels 4 and 5 are positioned on the outside of the transmission gearing, thereby rendering it possible to house all of the gearing compactly and neatly by the general housing construction shown at 19, whereby the gearing 2 and 3 on the drive shaft, and the gearing mounted upon the trunnions 8, and likewise the gearing upon the axle trunnions 14 are completely inclosed, thereby removing the entire construction from the dust and dirt incident to use, and further providing an inclosable gear on the rear axle which has been difficult to obtain with the constructions hitherto employed. Further, the drive to the rear axle is a central one, and the strains of torsion incident to the usual construction are absent from the construction herein shown. These differences of construction are found to possess great advantages and benefits not derivable from constructions hitherto known, and we desire to claim any modifications of our invention which properly lie within the scope thereof.

What we claim is:

1. A transmission gearing construction comprising a power shaft, a pair of intermediate shafts arranged end to end, a second pair of shafts arranged end to end, differential gearing arranged on said intermediate shafts, gearing for communicating the power to said intermediate shafts, gearing for transmitting power from the said intermediate shafts to said second pair of shafts, bearings for all of said shafts being arranged at points beyond the gearing.

2. A transmission gearing comprising a power shaft, a pair of intermediate shafts arranged end to end, a second pair of shafts arranged end to end, differential gearing arranged on said intermediate shafts, gearing for communicating the power to said intermediate shafts, gearing for transmitting power from the said intermediate shafts to said second pair of shafts, bearings for all of said shafts being arranged at points beyond the gearing, and a continuous housing for all of said gearing.

3. A transmission gearing construction comprising a driving shaft, slidable gearing thereon, a pair of intermediate shafts arranged end to end, a differential gearing thereon, gearing meshing with said slidable gearing whereby said intermediate shafts are rotated, pinions carried on said intermediate shafts adjacent to the inner ends thereof, bearings for said shafts beyond said pinions thereon, a second pair of shafts arranged end to end, gear wheels thereon adapted to mesh respectively with said pinions, whereby the power is transmitted to said second pair of shafts, and the housing covering all of the said gearing constructions.

4. In a transmission gearing construction a driving shaft, slidable gearing thereon, intermediate tubular shafts arranged end to end, gearing thereon adapted to mesh with said slidable gearing, a tie-rod securing together said tubular intermediate shafts, differential gearing provided upon said intermediate shafts, pinions mounted upon said intermediate shafts adjacent to their inner ends, a second pair of tubular shafts, and gear wheels thereon adjacent to their inner ends adapted to mesh with said pinions.

5. In a transmission gearing construction, a driving shaft, slidable gearing thereon, intermediate tubular shafts arranged end to end, gearing thereon adapted to mesh with said slidable gearing, a tie-rod within said tubular intermediate shafts, differential gearing provided upon said intermediate shafts, pinions mounted upon said intermediate shafts adjacent to their inner ends, a second pair of tubular shafts, gear wheels thereon adjacent to their inner ends adapted to mesh with said pinions, a tie-rod in said second pair of tubular shafts for alining the parts thereof, and bearings for said shafts at points beyond the gears mounted thereon.

6. In a transmission gearing construction, a driving shaft, gearing thereon, intermediate shafts arranged end to end, gearing thereon adapted to mesh with said first mentioned gearing, differential gearing carried by said intermediate shafts, pinions mounted upon said intermediate shafts between the bearings for said shafts and the inner ends thereof, a second pair of shafts arranged end to end, gears thereon adapted to mesh with said pinions, whereby the power is transmitted along a line approximately centrally of all the shafts, and a housing for said transmission gearing construction.

7. A transmission gearing construction comprising a driving shaft, a pair of intermediate shafts arranged end to end, differential gearing thereon, a second pair of shafts arranged end to end, gearing on each pair of shafts arranged approximately along a line drawn centrally of said construction, said pairs of shafts being tubular and having their bearings at points beyond the gearing thereon, and means for alining said tubular shafts and maintaining the same in proper relative position.

In testimony whereof we affix our signatures in the presence of two witnesses.

LEE A. FRAYER.
CHARLES O. HOWARD.

Witnesses:
GEO. W. RIGHTMIRE,
HORACE S. KERR.